Patented Aug. 20, 1935

2,012,096

UNITED STATES PATENT OFFICE 2,012,096

WATER-INSOLUBLE MONOAZODYESTUFFS AND THEIR PRODUCTION

Achille Conzetti, Basel, Switzerland, assignor to the firm J. R. Geigy S. A., Basel, Switzerland No Drawing. Application November 22, 1933, Serial No. 699,303. In Germany November 28, 1932

6 Claims. (Cl. 260—95)

The present invention relates to the manufacture of monoazodyestuffs which are soluble in varnishes, but insoluble in water and are fast or very fast to light, consisting in combining a diazo-compound of ortho-nitraniline or of a substitution product thereof with an alkyl-ester of 2,3-hydroxynaphthoic acid. The dyestuffs thus obtained have pure, bright yellow-red to blue-red shades and owing to their remarkable fastness to light and to acids they find various applications in the varnish industry. They are especially suitable for dyeing or coloring nitrocellulose lacquers and acetyl cellulose lacquers, varnish lacquers, transparent metal lacquers, glass colors, coatings on films, wood, leather, metal, paper, glass, artificial masses, candles, fats and lubricating oils.

The invention is illustrated by the following examples:—

Example 1

9.1 kilos of 1-amino-4-ethoxy-2-nitrobenzene are diazotized in the usual manner and the diazo-solution, after having been filtered, is allowed to run slowly into a solution, cooled with ice, of 12 kilos of 2,3-hydroxynaphthoic acid ethyl-ester, 350 kilos of ethyl-alcohol, 12 kilos of crystalline sodium acetate and 500 grams of glacial acetic acid. After coupling is completed, the dyestuff is separated by filtration, washed with a little alcohol and much warm water and then dried. It dyes nitrocellulose and acetyl cellulose lacquers in pure and bright blue-red shades.

Example 2

9.5 kilos of 1-amino-2,4-dinitrobenzene are diazotized in the usual manner in nitrosyl-sulphuric acid. The whole is poured on to ice, filtered and the clear diazo solution so obtained is allowed to run at 10° C. into a solution of 12 kilos of 2,3-hydroxynaphthoic acid ethyl-ester in 300 kilos of ethyl-alcohol. When coupling is completed, the dyestuff is filtered and washed first with ethyl-alcohol and then with warm water. It dyes lacquers pure red shades.

Example 3

7.6 kilos of 1-amino-4-methyl-2-nitrobenzene are diazotized in known manner and the filtered diazo-solution is allowed to run at 10° C. into a solution prepared from 12 kilos of 2,3-hydroxynaphthoic acid ethyl-ester, 350 kilos of ethyl-alcohol, 12 kilos of crystalline sodium acetate and 500 grams of glacial acetic acid. When coupling is completed, the dyestuff is filtered and washed first with alcohol and then with warm water. It dyes lacquers pure scarlet-red shades of good fastness to light.

Example 4

4.65 kilos of 1-amino-2-nitrobenzene are diazotized as usual and the filtered diazo solution is added to a solution prepared from 13 kilos of 2,3-hydroxynaphthoic acid amyl-ester, 500 kilos of ethyl-alcohol, 15 kilos of crystalline sodium acetate and 500 grams of glacial acetic acid. When coupling is completed, the dyestuff is worked up as described in Example 3. It dyes lacquers pure scarlet-red shades of remarkable fastness to light.

Example 5

A filtered diazo-solution prepared from 4.65 kilos of 1-amino-2-nitrobenzene is allowed to run into a solution prepared from 12 kilos of 2,3-hydroxynaphthoic acid ethyl-ester, 250 kilos of ethyl-alcohol, 12 kilos of crystalline sodium acetate and 500 grams of glacial acetic acid. When coupling is completed, the dyestuff is worked up as indicated in Example 3. It dyes lacquers pure scarlet-red shades of remarkable fastness to light.

Example 6

A filtered diazo-solution prepared from 10.5 kilos of 1-amino-2-nitrobenzene-4-carboxylic acid ethyl-ester is allowed to run into a solution prepared from 12 kilos of 2,3-hydroxynaphthoic acid ethyl-ester, 300 kilos of ethyl-alcohol, 12 kilos of crystalline sodium acetate and 500 grams of glacial acetic acid. When coupling is completed, the dyestuff is worked up in the usual manner. It dyes lacquers pure bluish-red shades which are fast to light.

What I claim is:—

1. A process for the manufacture of monoazodyestuffs insoluble in water, comprising coupling a diazo-compound of an ortho-nitraniline of the general formula:

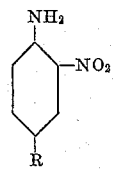

wherein R may stand for hydrogen, $NO_2$, $CH_3$, $OC_2H_5$ or $COOC_2H_5$, with an alkyl-ester of 2,3-hydroxynaphthoic acid.

2. A process for the manufacture of monoazodyestuffs insoluble in water, comprising coupling a diazo-compound of an ortho-nitraniline of the general formula:

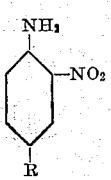

wherein R may stand for hydrogen, $NO_2$, $CH_3$, $OC_2H_5$ or $COOC_2H_5$, with the ethyl-ester of 2,3-hydroxynaphthoic acid.

3. A process for the manufacture of monoazo-dyestuffs insoluble in water, comprising coupling a diazo-compound of 1-amino-4-ethoxy-2-nitrobenzene with an alkyl-ester of 2,3-hydroxynaphthoic acid.

4. A process for the manufacture of monoazo-dyestuffs insoluble in water, comprising coupling a diazo-compound of 1-amino-2,4-dinitrobenzene with an alkyl-ester of 2,3-hydroxynaphthoic acid.

5. A process for the manufacture of monoazo-dyestuffs insoluble in water, comprising coupling a diazo-compound of 1-amino-4-methyl-2-nitrobenzene with an alkyl-ester of 2,3-hydroxynaphthoic acid.

6. The water insoluble monoazodyestuffs from a diazo-compound of an ortho-nitraniline of the general formula:

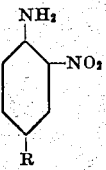

wherein R may stand for hydrogen, $NO_2$, $CH_3$, $OC_2H_5$ or $COOC_2H_5$, and a 2,3-hydroxynaphthoic acid alkyl-ester, having pure, bright yellow-red to blue-red shades and being owing to their remarkable fastness to light and to acids particularly useful in the varnish industry.

ACHILLE CONZETTI.